United States Patent [19]

Berends

[11] Patent Number: 4,880,642
[45] Date of Patent: Nov. 14, 1989

[54] METHOD OF MAKING CHEWING BONES FOR PETS

[76] Inventor: Jos Berends, M. de Klerkstraat 27, 1333 PL Almere Buiten, Netherlands

[21] Appl. No.: 126,968

[22] Filed: Nov. 30, 1987

[51] Int. Cl.$^4$ ............................ A23K 1/10; A23K 1/18
[52] U.S. Cl. ............................................ 426/5; 426/3; 426/456; 426/472; 426/480; 426/805
[58] Field of Search ................... 426/3, 456, 465, 472, 426/480, 509, 510, 520, 805, 417, 641, 5

[56] References Cited

U.S. PATENT DOCUMENTS

| | | | |
|---|---|---|---|
| 3,882,257 | 5/1975 | Cagle | 426/805 X |
| 4,163,804 | 8/1979 | Meyer et al. | 426/641 X |
| 4,260,635 | 4/1981 | Fisher | 426/805 X |

FOREIGN PATENT DOCUMENTS

| | | |
|---|---|---|
| 0220785 | 5/1987 | European Pat. Off. . |
| 3032959 | 3/1982 | Fed. Rep. of Germany ...... 426/805 |
| 3041237 | 6/1982 | Fed. Rep. of Germany ...... 426/805 |
| 975333 | 11/1964 | United Kingdom . |

*Primary Examiner*—Arthur L. Corbin
*Attorney, Agent, or Firm*—Fleit, Jacobson, Cohn, Price, Holman & Stern

[57] ABSTRACT

Chews for pets are made from sinews or tendons of cattle and other livestock by the method of cooking the tendons and sinews, followed by the removal of meat and fat, and then baking at a temperature of at least 200° C. until they are completely or substantially completely hardened.

7 Claims, No Drawings

METHOD OF MAKING CHEWING BONES FOR PETS

BACKGROUND OF THE INVENTION

1. Field of the Invention

This invention relates to a method of treating tendons and/or sinews from cattle and other animals, such as cows, bulls, oxen, horses and ponies, to produce chews for pets.

2. Description of the Prior Art

It is known to make chews for pets by treating cattle skin and the like, for example, by grinding the skin or skin parts, and converting the skin meal with a binder to a form which appeals to the pet.

It is also known for animal skin, preferably buffalo skin, to be first soaked in water or other solvent, whereafter the product is homogenized in a pasty or partially liquid state, and brought into a form and size suitable for use.

According to another known method, a dog chew is made by bringing one or more pieces of folded or rolled rawhide into a suitable shape in a mold. This is subsequently subjected to pressure or a combination of pressure and heat, whereby the rawhide assumes the shape of the mold and becomes a solid mass.

SUMMARY OF THE INVENTION

The object of the present invention is the manufacture of a chew for pets which is not made on the basis of skin or skin parts, but of animal parts up till now generally regarded as offal. Another object of the invention is to provide a chew that is widely accepted by the pets as a snack and the like.

The invention is based on the surprising insight that it is possible through a certain treatment, to convert tendons and sinews from cattle and other animals, such as cows, bulls, oxen, horses and ponies, into a hard product having good keeping characteristics, and which, possibly in combination with intermediate molding, is particularly suitable as a chew for pets, in particular dogs.

The invention is characterized by treating the tendons and/or sinews to remove all, or substantially all appendant fat and meat, and heating the tendons and/or sinews stripped of meat and fat at a temperature of at least 200° C. until the tendons and/or sinews have hardened completely or substantially completely.

DETAILED DESCRIPTION OF THE INVENTION

Preferably, the tendons or sinews are first cooked in an aqueous phase, whereafter meat and fat are removed.

In principle, the method according to the present invention can be applied to all tendons and sinews which become available in dressing butchered cattle. Particularly suitable are neck sinews or taddywacks, Achilles tendons and silversides.

During dressing, tendons and sinews are removed, as free from fat and meat as possible. However, especially in production lines, it is virtually impossible to remove all fat and meat completely. Some residues will always remain behind. In the process of the present invention, therefore, the tendons (which term as used in this description and the appended claims includes sinews and mixtures of tendons and sinews) are first subjected to a treatment for removing meat and fat completely or substantially completely. Generally speaking, this treatment consists in boiling or steaming the tendons at temperatures of higher than 90° C. until the meat is cooked, and the sheaths become soft. Generally speaking, it can be stated that this step includes cooking the tendons. This is generally done over a period of from 4 to 6 hours, and preferably in an aqueous phase, for example, water or a broth. A broth is preferred if it is desired to add additional substances such as flavors to the chew. The treatment is generally preferably effected at a temperature of in excess of 90° C., it being not so critical whether this takes place under atmospheric pressure or at elevated pressure.

After treating the tendons as described above, any appendant meat and fat are removed. This can be done mechanically or manually, and is best done warm, as meat and fat can then be removed more easily. In this connection 'warm' means a temperature intermediate room temperature and the temperature at which the tendons have been cooked.

After removing meat and fat, the tendons are, if desired, brought into a desired shape. This can mean cutting them into pieces, pressing them in a certain form, twisting or knotting them, etc. It is also possible, however, to leave the tendons as they are in the form they have after meat and fat have been removed.

The molding step, if any, should be effected relatively quickly, as the cooked tendons are extremely prone to molding or rotting.

After the removal of meat and fat, the tendons are heated at a temperature of at least 200° C., until they are hardened completely or substantially completely. It is essential that, for at least a portion of this baking period, the tendon is maintained at a temperature of more than 200° C. If this is not done, the product is insufficiently hardened, which greatly detracts from its keeping characteristics.

These keeping characteristics are clearly enhanced if the tendons are first heated at a temperature in excess of 200° C. for some time, and then additionally at a lower temperature, for example, 180°-200° C. In a suitable embodiment, the tendons are gradually brought to a temperature of 240° C. over a period of one half hour to two hours, whereafter the temperature is decreased and the tendons are maintained at 160° C.-200° C. for one half hour to two hours.

After this high-temperature treatment, the tendons are generally fully or substantially fully hardened, and have extremely good keeping characteristics. In certain cases, depending on the quality and thickness of the starting material, it may occur that not all tendons of a certain batch are fully hardened through. In that case, these may be subsequently baked, if desired, until these too are completely hardened and have the above excellent quality of keeping for one or more years.

The treatment of the tendons stripped of fat and meat is generally effected in a conventional oven, but it is also possible to use a magnetron oven or other heating facilities. When heating on the basis of induction is used, as in magnetron ovens, it should be taken into account that the heating periods may differ from the periods indicated above, which relate to more conventional systems.

The invention is illustrated in and by the following example.

EXAMPLE

A batch of about 120 kg cow's neck tendons, or taddywacks was cooked in water for a period of 5 hours when meat and fat could be readily removed mechanically from the tendons. After the removal of meat and fat, the tendons were brought to a temperature of 240° C. in a period of about 1.5 hours. Thereafter the temperature was lowered to 190° C., which temperature was maintained for another 1.5 hours. Approximately 50 kg product was obtained, 90% of which, i.e., 45 kg was hard both inside and outside. After baking the remaining quantity for a further short period of time, the entire batch of 50 kg was completely hardened and could be kept without any problems with regard to molding and rotting for a prolonged period of time, i.e. one year or longer.

I claim:

1. A method of making chewing bones for pets comprising:
   cooking a batch of tendons of cattle, cows, bulls, oxen, horses and ponies in an aqueous solution for a period of approximately five hours at a temperature higher than 90° C.;
   removing substantially all meat and fat from said tendons;
   heating said batch of tendons to approximately 240° C. in a period of approximately 1.5 hours;
   lowering said temperature from approximately 240° C. to approximately 190° C.;
   maintaining said temperature of approximately 190° C. for approximately 1.5 hours to obtain a substantially 90% hardened batch of tendons; and then
   baking the remaining unhardened tendons of said batch for an additional period until substantially all of the tendons of said batch are hardened.
2. A method as claimed in claim 1 wherein:
   said tendons comprise taddywacks.
3. A method as claimed in claim 1 wherein:
   said tendons comprise silversides.
4. The method as claimed in claim 1 wherein:
   said step of cooking comprises boiling the tendons.
5. The method as claimed in claim 1 wherein:
   said step of cooking comprises steaming the tendons.
6. The method as claimed in claim 1 and further comprising:
   between said meat and fat removal step and said heating step, shaping the tendons into a desired shape.
7. The method as claimed in claim 6 wherein:
   said shaping comprises pressing in a mold.

* * * * *